(12) United States Patent
Takechi et al.

(10) Patent No.: US 10,470,448 B2
(45) Date of Patent: Nov. 12, 2019

(54) DUAL-BEARING REEL

(71) Applicant: Shimano Inc., Sakai, Osaka (JP)

(72) Inventors: Kunio Takechi, Sakai (JP); Takeshi Ikuta, Sakai (JP); Youhei Toake, Sakai (JP); Motohiro Niitsuma, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 171 days.

(21) Appl. No.: 15/689,125

(22) Filed: Aug. 29, 2017

(65) Prior Publication Data

US 2018/0103627 A1  Apr. 19, 2018

(30) Foreign Application Priority Data

Oct. 19, 2016 (JP) .................. 2016-205418

(51) Int. Cl.
*A01K 89/01* (2006.01)
*A01K 89/015* (2006.01)
*A01K 89/033* (2006.01)

(52) U.S. Cl.
CPC .... *A01K 89/0193* (2015.05); *A01K 89/01931* (2015.05); *A01K 89/033* (2013.01); *A01K 89/053* (2015.05)

(58) Field of Classification Search
CPC .......... A01K 89/01931; A01K 89/0192; A01K 89/033; A01K 89/046; A01K 89/0155
See application file for complete search history.

(56) References Cited

U.S. PATENT DOCUMENTS

| | | | | |
|---|---|---|---|---|
| 2,651,477 A | * | 9/1953 | Mandolf | A01K 89/01931 242/118.8 |
| 4,585,182 A | * | 4/1986 | Atobe | A01K 89/0192 242/223 |
| 5,183,221 A | * | 2/1993 | Kawai | A01K 89/0192 242/310 |
| D351,451 S | * | 10/1994 | Storz | D22/140 |
| 5,356,090 A | * | 10/1994 | Sato | A01K 89/0178 242/289 |
| D366,690 S | * | 1/1996 | Storz | D22/140 |
| D376,835 S | * | 12/1996 | Asano | D22/140 |
| D394,896 S | * | 6/1998 | Asano | D22/140 |
| 5,762,280 A | * | 6/1998 | Takahashi | A01K 89/0192 242/310 |

(Continued)

FOREIGN PATENT DOCUMENTS

JP   H0555875 U   7/1993
JP   H0753498 Y   12/1995

*Primary Examiner* — Emmanuel M Marcelo
(74) *Attorney, Agent, or Firm* — United IP Counselors, LLC (57) ABSTRACT

A dual-bearing reel includes a reel body and a spool. The reel body includes a first body part, a second body part, and a thumb rest. The spool is rotatably disposed between the first body part and the second body part. The spool includes a bobbin trunk, a first flange, and a second flange. The first flange is on a first body part side of the bobbin trunk, and has a smaller diameter than the first body part. The second flange is on a second body part side of the bobbin trunk, and has a smaller diameter than the second body part. The first body part includes a cutout part on an outer edge of the first body part. The cutout part is adjacent to the thumb rest and to an outer edge of the first flange of the spool.

9 Claims, 5 Drawing Sheets

(56) References Cited

U.S. PATENT DOCUMENTS

| | | | | |
|---|---|---|---|---|
| 5,829,701 | A * | 11/1998 | Murayama | A01K 89/0192 242/310 |
| 5,988,548 | A * | 11/1999 | Chapman | A01K 89/0192 242/310 |
| 6,016,982 | A * | 1/2000 | Asano | A01K 89/01916 242/310 |
| 6,196,485 | B1 * | 3/2001 | Sato | A01K 89/01557 242/289 |
| 6,364,230 | B1 * | 4/2002 | Kawasaki | A01K 89/0155 188/181 A |
| 6,371,396 | B1 * | 4/2002 | Kawasaki | A01K 89/01557 242/289 |
| 6,460,793 | B1 * | 10/2002 | Hirayama | A01K 89/0192 242/313 |
| 2004/0075005 | A1 * | 4/2004 | Myojo | A01K 89/01921 242/310 |
| 2004/0079822 | A1 * | 4/2004 | Kawasaki | A01K 89/01931 242/322 |
| 2007/0181728 | A1 * | 8/2007 | Kawasaki | A01K 89/00 242/310 |
| 2009/0166460 | A1 * | 7/2009 | Kitajima | A01K 89/01931 242/322 |
| 2013/0181081 | A1 * | 7/2013 | Niitsuma | A01K 89/033 242/289 |
| 2016/0183508 | A1 * | 6/2016 | Kano | A01K 89/01931 242/257 |
| 2017/0013818 | A1 * | 1/2017 | Kobayashi | A01K 89/0193 |
| 2017/0196211 | A1 * | 7/2017 | Umezawa | A01K 89/0192 |
| 2017/0208789 | A1 * | 7/2017 | Numata | A01K 89/01555 |
| 2017/0328421 | A1 * | 11/2017 | Ahmad | A01K 89/0189 |

* cited by examiner

DUAL-BEARING REEL

CROSS-REFERENCE TO RELATED APPLICATIONS

This application claims priority to Japanese Patent Application No. 2016-205418 filed on Oct. 19, 2016, the entirety of which is hereby incorporated by reference in its entirety.

BACKGROUND

Technical Field

The present disclosure relates to a dual-bearing reel capable of releasing a fishing line forward.

Background Information

In dual-bearing reels in which a spool is rotated when a fishing line is released, the rotational speed of the spool becomes faster than the releasing speed of the fishing line in casting or in dropping a terminal tackle into the water, whereby so-called backlash occurs, which is a phenomenon in which the fishing line sags (occurrence of line sag) and is tangled. As one of the means for preventing backlash, a so-called thumbing operation is well known, which is an operation of applying resistance to rotation of the spool by touching a flange of the spool with a finger of an angler so as to inhibit the rotation of the spool. It should be noted that an operation with the thumb has been originally referred to as "thumbing". Recently, however, an operation with the index or middle finger has been also referred to as "thumbing".

Additionally, the thumbing operation is used not only in casting but also in controlling the fishing line and dealing with movement of hooked fish after casting. In view of this, Japan Examined Utility Model Application Publication No. H07-53498 describes a configuration in which a finger guide surface is provided for guiding a finger from the outer peripheral part of a side frame to that of a spool, whereby a thumbing operation can be quickly and smoothly performed. Additionally, FIGS. 6 to 8 in Japan Utility Model Application Publication No. H05-55875 show a configuration in which a reel side plate includes a recessed part so as to expose the outer peripheral part of a spool through the reel side plate.

In Japan Examined Utility Model Application Publication No. H07-53498, a finger of an angler is smoothly guided to the outer peripheral part of the spool by the finger guide surface. However, the outer peripheral part of the spool and the finger guide surface are disposed at a distance. Hence, it takes time for the finger to reach the outer peripheral part of the spool from the finger guide surface. This makes it difficult to quickly perform a thumbing operation.

BRIEF SUMMARY

It is an object of the present disclosure to enable a thumbing operation to be quickly and smoothly performed for a dual-bearing reel capable of releasing a fishing line forward.

A dual-bearing reel according to one aspect of the present disclosure is configured to release a fishing line in a forward direction, and includes a reel body and a spool. The reel body includes a first body part, a second body part and a thumb rest. The second body part is disposed at an interval from the first body part in an axial direction. The thumb rest is on a rear side of the first body part and the second body part, and between the first body part and the second body part. The spool is rotatably disposed between the first body part and the second body part, and includes a bobbin trunk, a first flange and a second flange. The fishing line is wound about an outer periphery of the bobbin trunk. The first flange is on a first body part side of the bobbin trunk, and has a smaller diameter than the first body part. The second flange is on a second body part side of the bobbin trunk, and has a smaller diameter than the second body part. The first body part includes a cutout part on an outer edge of the first body part adjacent to the thumb rest. The cutout part can be formed by cutting out the outer edge such that the outer edge is adjacent to an outer edge of the first flange of the spool.

In the present dual-bearing reel, the thumb of a hand holding the reel body is guided from the thumb rest to the outer edge of the spool by the cutout part. Hence, a thumbing operation can be quickly and smoothly performed.

The cutout part includes a curved surface. The curved surface is recessed to an inner peripheral side of the first body part, and slants such that an outer diameter of the curved surface reduces in accordance with proximity to the outer edge of the first flange of the spool. In this case, in addition to the aforementioned advantageous effect, the cutout part can be used as a finger rest. Therefore, a thumbing operation can be more quickly performed.

The thumb rest can include a circular-arc surface, and the circular-arc surface can smoothly continue to the curved surface. In this case, the thumb of a hand holding the reel body is more quickly and smoothly guided from the thumb rest to the outer edge of the spool.

The dual-bearing reel can further include a handle and a clutch lever. The handle is rotatably attached to an outer lateral surface of the reel body. The clutch lever is provided on an outer lateral surface of the first body part of the reel body and has a tip extended toward the spool. The clutch lever pivots between a first position and a second position. The first position corresponds to a clutch-on state in which the handle and the spool are coupled to each other, whereas the second position corresponds to a clutch-off state in which the handle and the spool are decoupled from each other. The cutout part can be on the outer edge of the first body part adjacent to the thumb rest in a pivotable range of the clutch lever between the first position and the second position.

In this case, the cutout part functions as a finger rest after the clutch lever is operated, and the thumb of a hand holding the reel body is quickly and smoothly guided to the outer edge of the spool via the cutout part from the position to which the clutch lever can be operated and moved. Accordingly, for instance, a motion from a clutch-off operation to a thumbing operation can be smoothly and seamlessly performed.

Each of the first and second flanges can include a medial side surface and an outer peripheral surface. The medial side surface is on an end of the bobbin trunk. The outer peripheral surface extends axially outward from a distal end of the medial side surface. Additionally, the distal end of the medial side surface of one of the first and second flanges can have a larger outer diameter than the distal end of the medial side surface of the other of the first and second flanges. The medial side surface and the outer peripheral surface of the one of the first and second flanges can be connected by a smooth curved surface.

In this case, a thumbing operation can be performed by touching the curved surface of the flange with the thumb. Hence, the contact of a finger becomes stable. Accordingly, a subtle thumbing control is enabled. Additionally, the curved surface of the flange is located adjacent to the cutout part. Hence, a thumbing operation can be more quickly and smoothly performed.

The other of the first and second flanges can further include a cylindrical surface. The cylindrical surface extends axially outward from an outermost diameter part of the outer peripheral surface of the other of the first and second flanges. In this case, when the spool is attached to the reel body, the cylindrical surface is disposed on the inner peripheral side of the reel body. Accordingly, an interval between the reel body and the spool can be accurately controlled, and the fishing line can be inhibited from getting stuck between the reel body and the spool.

The outer peripheral surface of the one of the first and second flanges can slant more gently than the medial side surface of the one of the first and second flanges with respect to a rotational axis of the spool. With this configuration, the curved surface, connecting the medial side surface and the outer peripheral surface of the one of the first and second flanges, is stably touched by the thumb. Hence, a thumbing operation can be performed while the thumb is firmly pushed on the curved surface.

At least one of the outer peripheral surface and the curved surface of the one of the first and second flanges can include a recognition part. The recognition part is accessible through the cutout part, and is an irregularity along the one of the outer peripheral surface and the curved surface in a circumferential direction about a rotational axis of the spool. The recognition part can be touched by a thumb of a hand holding the reel body such that a rotational frequency of the spool can be recognized. In this case, when the curved surface is touched by a finger, part of the recognition part makes contact with the finger. Therefore, an angler can perform a thumbing operation while recognizing the extent of the rotational frequency (or the rotational speed) of the spool. Hence, the rotational frequency (or the rotational speed) can be minutely regulated.

The recognition part can be at least one of a protrusion or an indentation. In this case, the extent of the rotational frequency (or the rotational speed) of the spool can be easily recognized with the at least one protrusion or indentation touched by a finger.

The first or second body part can include a finger guide surface on at least a part of an outer edge of the first or second body part located on a front side of the spool, below a rotational center of the spool, and adjacent to an outer edge of the first or second flange. The finger guide surface is formed by cutting out the outer edge such that the outer edge is adjacent to an outer edge of the first or second flange. In this case, a thumbing operation can be performed for a part of the flange, opposed to the cutout part through the axis of the spool, with the index or middle finger. Hence, a braking force can be more strongly and stably applied to the spool.

Overall, according to the present disclosure, it is possible to provide a dual-bearing reel for which a thumbing operation can be quickly and smoothly performed.

BRIEF DESCRIPTION OF THE DRAWINGS

Referring now to the attached drawings which form a part of this original disclosure.

DETAILED DESCRIPTION OF EMBODIMENTS

Figure 1:
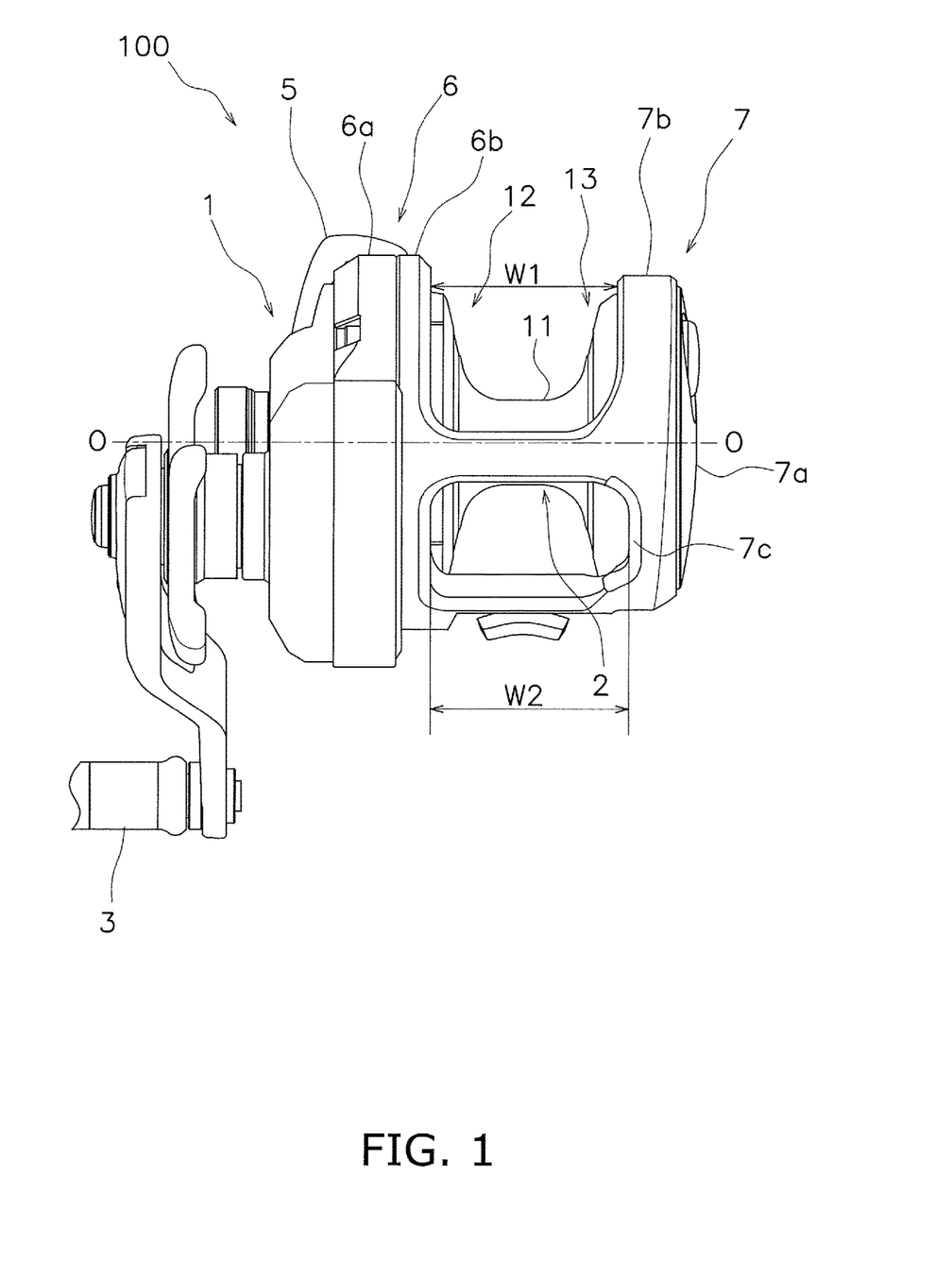
FIG. 1 is a front view of a dual-bearing reel according to the present disclosure.
Figure 2:
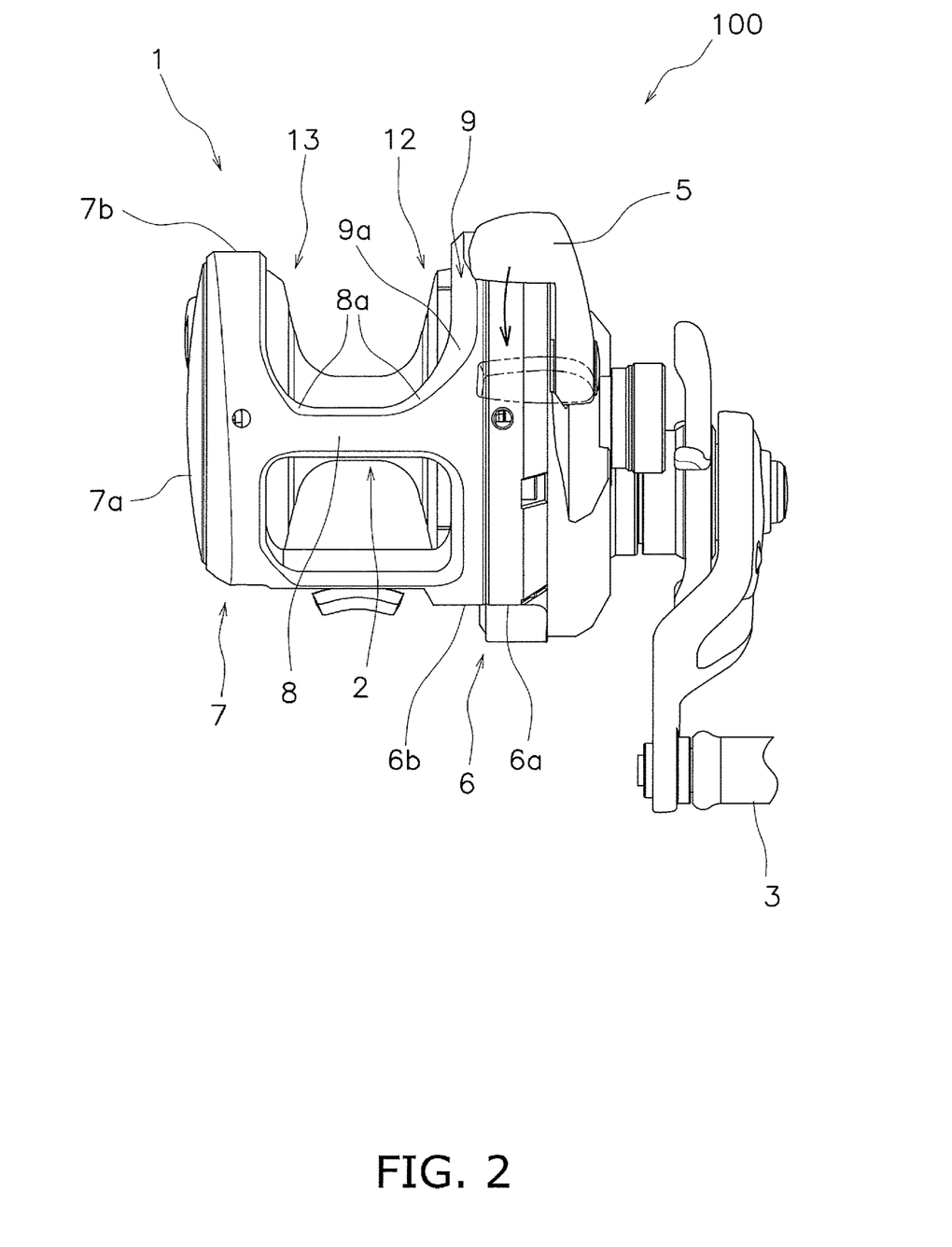
FIG. 2 is a rear view of the dual-bearing reel according to the present disclosure.

As shown in FIGS. 1 to 4, a dual-bearing reel 100 is a dual-bearing reel capable of releasing a fishing line forward. The dual-bearing reel 100 includes a reel body 1, a spool 2, a handle 3, a rotation transmission mechanism 4 (see FIG. 4) and a clutch lever 5. It should be noted that FIG. 1 is a view of the dual-bearing reel 100 as seen from a front side (a tip side of a fishing rod when the dual-bearing reel 100 is attached to the fishing rod), whereas FIG. 2 is a view of the dual-bearing reel 100 as seen from a rear side.

The reel body 1 includes a first body part 6, a second body part 7 and a thumb rest 8. The first body part 6 includes a first side cover 6a and a first side plate 6b. The first side cover 6a is attached to the first side plate 6b so as to cover a lateral surface of the first side plate 6b. The first side plate 6b includes a cutout part 9 recessed to the inner peripheral side of the first side plate 6b. The cutout part 9 will be described below in detail.

The second body part 7 is disposed axially at an interval from the first body part 6. The second body part 7 includes a second side cover 7a and a second side plate 7b. The second side cover 7a is attached to the second side plate 7b so as to cover a lateral surface of the second side plate 7b. The second side plate 7b includes a finger guide surface 7c. The finger guide surface 7c will be described below in detail.

The thumb rest 8 is disposed on a rear side in the reel body 1. The thumb rest 8 couples the first side cover 6a and the second side cover 7a while axially extending between the first side cover 6a and the second side cover 7a. The thumb rest 8 includes circular-arc surfaces 8a on both ends of the thumb rest 8. The circular-arc surfaces 8a take the form of curved surfaces continuing to the first side plate 6b and the second side plate 7b.

Figure 4:
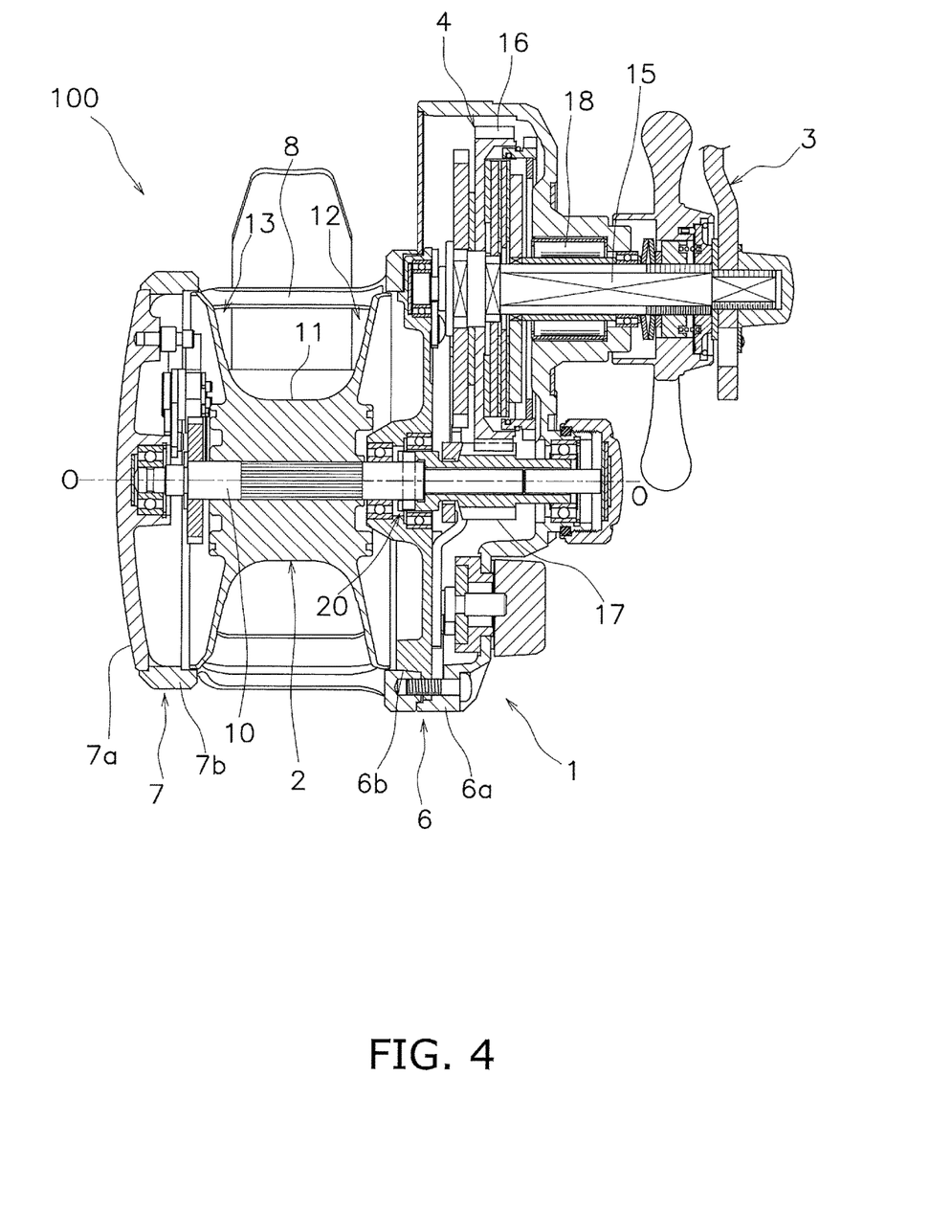
FIG. 4 is a cross-sectional view of the dual-bearing reel according to the present disclosure.

The spool 2 is rotatably disposed between the first body part 6 and the second body part 7. As shown in FIG. 4, the spool 2 is fixed to a spool shaft 10 extending between the first body part 6 and the second body part 7, and is unitarily rotated with the spool shaft 10. It should be noted that the spool shaft 10 is rotatably supported by the first and second body parts 6 and 7 through bearing members and so forth.

Figure 5:
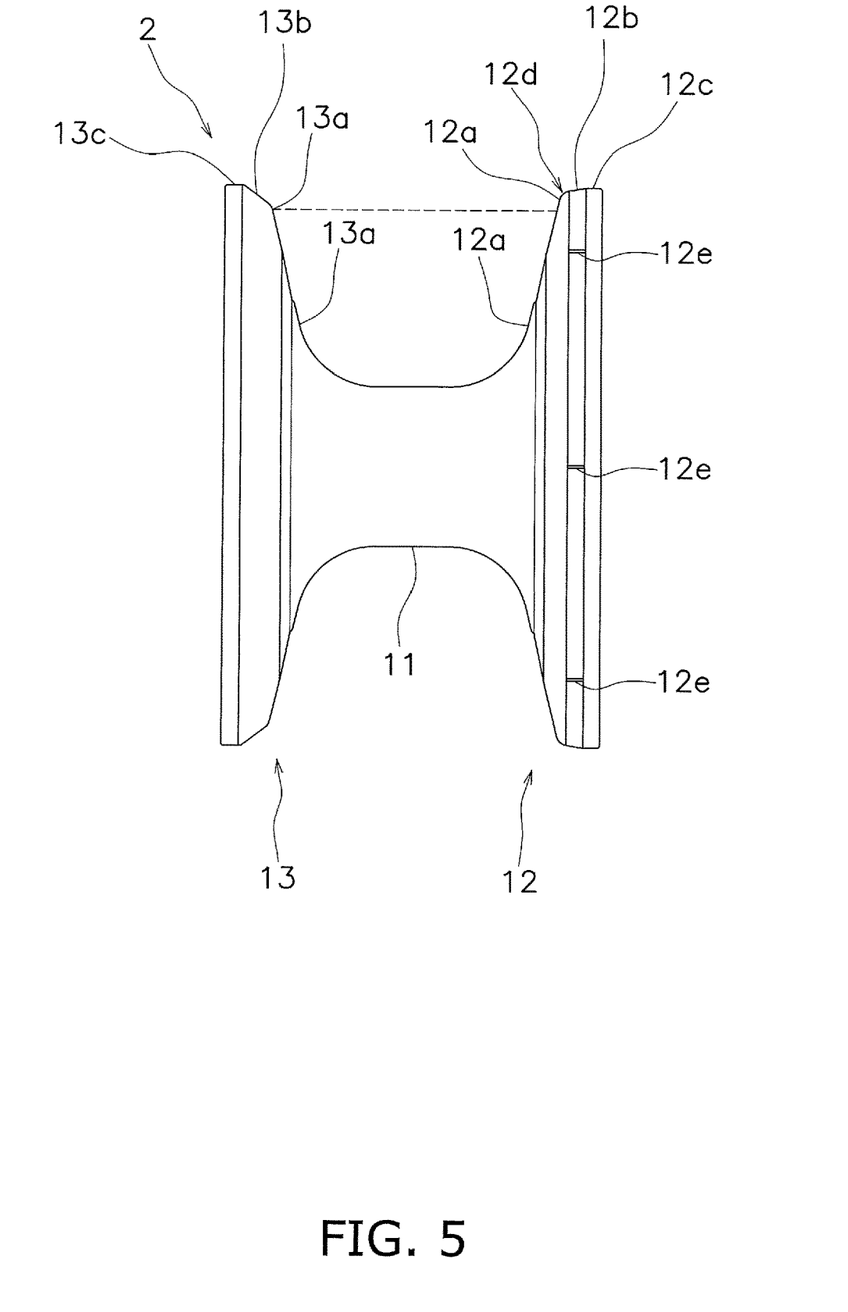
FIG. 5 is a rear view of a spool according to the present disclosure.

As shown in FIG. 5, the spool 2 includes a bobbin trunk 11, a first flange 12 and a second flange 13. A fishing line can be wound about an outer periphery of the bobbin trunk 11.

The first flange 12 is provided on the first body part 6 side of the bobbin trunk 11, and has a smaller outer diameter than the first body part 6. The first flange 12 includes a medial side surface 12a, an outer peripheral surface 12b and a cylindrical surface 12c.

The medial side surface 12a is shaped to slant axially outside such that the outer diameter of the medial side surface 12a gradually increases towards the first body part 6-side distal end of the bobbin trunk 11 (the right side in FIG. 5).

The outer peripheral surface 12b is shaped to slant such that the outer diameter of the outer peripheral surface 12b gradually increases from an outermost diameter part 12a' of the medial side surface 12a in accordance with an axially outward extension of the outer peripheral surface 12b. The outer peripheral surface 12b slants more gently than the medial side surface 12a with respect to a rotational axis of the spool 2. Additionally, the medial side surface 12*a* and the outer peripheral surface 12*b* are connected by a smooth curved surface 12*d*.

The cylindrical surface 12*c* is a flat surface extending axially outward from an outermost diameter part of the outer peripheral surface 12*b* parallel to the spool shaft 10. When the spool 2 is attached to the reel body 1, the cylindrical surface 12*c* opposes an inner peripheral part of the first side plate 6*b* of the first body part 6.

When a thumbing operation is performed, the thumb of an angler pushes on the curved surface 12*d*, whereby rotation of the spool 2 is inhibited. At this time, an area of the thumb contacting the first flange 12 is smaller than that when the thumb pushes on the medial side surface 12*a*. However, the contact of the thumb becomes stable, whereby the thumb can be firmly pushed on the curved surface 12*d*. Therefore, fine thumbing control is enabled by freely adjusting the magnitude of pressure per unit area applied to the curved surface 12*d*. In this case, a thumbing operation can be performed by touching the curved surface 12*d* of the first flange 12 with the thumb. Hence, the contact of the thumb becomes stable. Accordingly, a subtle thumbing control is enabled. Additionally, the curved surface 12*d* of the flange is located adjacent to the cutout part 9. Hence, a thumbing operation can be more quickly and smoothly performed. The curved surface 12*d* is an example of a thumb contacting means for enhancing contact during the thumbing operation.

The outer peripheral surface 12*b* includes a groove(s) 12*e* (exemplary recognition part) by which rotation of the spool 2 can be recognized. The groove(s) 12*e* crosses the outer peripheral surface 12*b* in the axial direction. The groove(s) 12*e* can be formed by laser engraving or so forth. The number of grooves 12*e* can be suitably set as long as it is at least one. When a plurality of grooves 12*e* are formed, the number of grooves 12*e* is desirably set (e.g., to be approximately in a range of 2 to 8 while the grooves 12*e* are evenly aligned in the circumferential direction) such that the extent of the rotational speed (or the rotational frequency) of the spool 2 is easily recognizable by an angler.

When touching the curved surface 12*d* with the thumb of the hand holding the reel body 1 during rotation of the spool 2, an angler can feel a contact stimulus by the groove(s) 12*e* provided on the outer peripheral surface 12*b*. Contact stimuli, such as of the groove(s) 12*e*, are an example of a rotation recognizing means for recognizing rotation of the spool 2. Therefore, when the angler adjusts the magnitude of pressure per unit area to be applied to the curved surface 12*d* while recognizing the extent of the rotational speed (or the rotational frequency) of the spool 2, it is possible to easily obtain a desirable rotational speed (or the rotational frequency) of the spool 2.

The second flange 13 is provided on the second body part 7 side of the bobbin trunk 11, and has a smaller outer diameter than the second body part 7. The second flange 13 includes a medial side surface 13*a*, an outer peripheral surface 13*b* and a cylindrical surface 13*c*.

The medial side surface 13*a* is shaped to slant axially outside such that the outer diameter of the medial side surface 13*a* gradually increases towards the second body part 7-side distal end of the bobbin trunk 11 (the left side in FIG. 5). It should be noted that, in one embodiment, the medial side surface 13*a* slants equally to the medial side surface 12*a* of the first flange 12 with respect to the rotational axis of the spool 2.

The outer peripheral surface 13*b* is shaped to slant such that the outer diameter of the outer peripheral surface 13*b* gradually increases from an outermost diameter part 13*a'* of the medial side surface 13*a* in accordance with an axially outward extension of the outer peripheral surface 13*b*.

The cylindrical surface 13*c* is a flat surface flatly extending axially outward from an outermost diameter part of the outer peripheral surface 13*b* parallel to the spool shaft 10. When the spool 2 is attached to the reel body 1, the cylindrical surface 13*c* opposes an inner peripheral part of the second side plate 7*b* of the second body part 7.

As depicted by a broken line in FIG. 5, the outermost diameter part 12*a'* of the medial side surface 12*a* of the first flange 12 is herein shaped to have a larger outer diameter than the outermost diameter part 13*a'* of the medial side surface 13*a* of the second flange 13. With this construction, even when the fishing line is wound to the vicinity of the outermost diameter part 13*a'* of the medial side surface 13*a* of the second flange 13 (the height depicted with broken line), the curved surface 12*d* of the first flange 12 is not covered with the fishing line. Therefore, a thumbing operation can be performed if the thumb is always firmly pushed on the curved surface 12*d*. Moreover, it is not required to push the thumb on the surface of the fishing line when a thumbing operation is performed. Hence, it is possible to prevent abrasion of the fishing line due to a thumbing operation and damage or injury of the thumb due to friction with the fishing line.

Next, the configuration of the cutout part 9 will be explained based on FIGS. 2 and 3. The cutout part 9 can be formed by cutting out the first side plate 6*b* of the first body part 6 such that part of the outer edge of the first side plate 6*b*, located adjacent to the thumb rest 8, gets closer to the outer edge (the curved surface 12*d*) of the first flange 12 of the spool 2. Detailedly, the cutout part 9 has a shape recessed to the inner peripheral side of the first side plate 6*b*, and takes the form of a curved surface 9*a*. The curved surface 9*a* slants such that the outer diameter of the curved surface 9*a* reduces in accordance with proximity to the curved surface 12*d* of the first flange 12 of the spool 2. Additionally, one of the circular-arc surfaces 8*a* nearest to the first side plate 6*b* is shaped to smoothly continue to the curved surface 9*a*. In this case, the thumb of a hand holding the reel body 1 is more quickly and smoothly guided from the thumb rest 8 to the outer edge of the spool 2. The circular-arc surface 8*a* nearest to the first side plate 6*b* is an example of a thumb guiding means for guiding a thumb of a hand during a thumbing operation.

By thus configuring the cutout part 9, accessibility to the first flange 12 of the spool 2 is enhanced when a thumbing operation is performed. In one embodiment, the thumb of a hand holding the reel body 1 is guided from the thumb rest 8 to the outer edge of the spool 2 by the cutout part 9. Hence, a thumbing operation can be quickly and smoothly performed. The cutout part 9 is an example of an accessibility enhancing means for enhancing accessibility of a thumbing operation. Additionally, the curved surface 12*d* of the first flange 12 is located in the vicinity of the cutout part 9. Hence, a thumbing operation can be quickly and smoothly performed. Moreover, the thumb can be put on the cutout part 9. Hence, a thumbing operation can be herein performed only by slightly moving the thumb from the cutout part 9 toward the spool 2.

Next, the configuration of the finger guide surface 7*c* will be explained with reference to FIG. 1. The finger guide surface 7*c* is provided on the outer edge of the second side plate 7*b* of the second body part 7 so as to be adjacent to the second flange 13. Detailedly, a lower front opening having a width W2 between the first side plate 6*b* and the second side plate 7*b* more widely extends toward the second side plate 7b than an upper opening having a width W1 between the first side plate 6b and the second side plate 7b. The finger guide surface 7c is provided on an outer edge of the second side plate 7b so as to be adjacent to this widely extending opening. The finger guide surface 7c can be formed by cutting out the outer edge of the second side plate 7b such that a front-side part of the outer edge of the second side plate 7b, located below the rotational center O of the spool 2, is adjacent to the outer edge (the cylindrical surface 13c) of the second flange 13 of the spool 2. In other words, the finger guide surface 7c is shaped such that an outer diameter of the finger guide surface 7c reduces in accordance with proximity to the cylindrical surface 13c of the second flange 13 of the spool 2.

With the finger guide surface 7c herein provided, braking of the spool 2 is enabled by touching a region from the outer peripheral surface 13b to the cylindrical surface 13c of the second flange 13 of the spool 2 with the index or middle finger of a hand holding the reel body 1 in the palm. In this case, a thumbing operation can be performed on a part of the second flange 13 with the index or middle finger. The region of the spool between outer peripheral surface 13b and the cylindrical surface 13c is an example of a finger braking means for braking the spool 2 during a thumbing operation. Moreover, the finger guide surface 7c and the cutout part 9 can be located on opposite sides of the spool shaft 10. Hence, a thumbing operation can be performed with use of both the finger guide surface 7c and the cutout part 9. Accordingly, a braking force can be applied to the spool 2 as strongly and stably as possible. The finger guide surface 7c is an example of a finger guiding means for enhancing a braking force during a thumbing operation.

The handle 3 is rotatably attached to the outer lateral surface of the first body part 6 of the reel body 1. As shown in FIG. 4, the handle 3 is attached to a drive shaft 15 protruding from the first body part 6. Rotation of the handle 3 is transmitted to the spool 2 through the rotation transmission mechanism 4.

The rotation transmission mechanism 4 is a mechanism that transmits the rotation of the handle 3 to the spool 2. The rotation transmission mechanism 4 includes the drive shaft 15, a drive gear 16 and a pinion gear 17.

The drive shaft 15 is coupled to the handle 3, and is unitarily rotated with the handle 3. It should be noted that the drive shaft 15 is prevented from rotating in a fishing line releasing direction by a one-way clutch 18.

The drive gear 16 is attached to the drive shaft 15 and is unitarily rotated with the drive shaft 15. The pinion gear 17 is meshed with the drive gear 16. The pinion gear 17 is coupled to the spool shaft 10 through a clutch mechanism 20 to be described.

Figure 3:
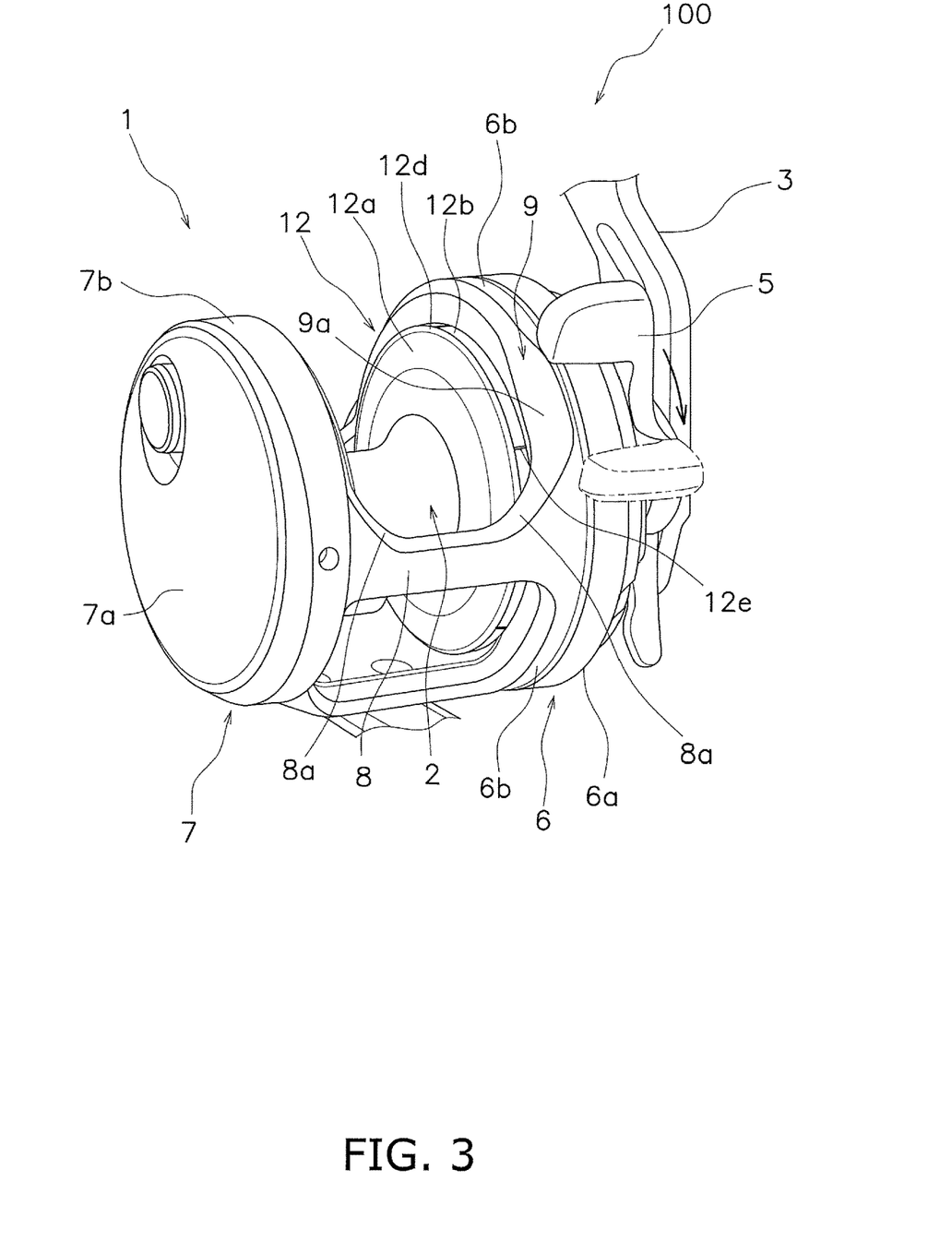
FIG. 3 is a perspective view of the dual-bearing reel according to the present disclosure.

As shown in FIGS. 2 and 3, the clutch lever 5 is provided on the outer lateral surface of the first body part 6 of the reel body 1. The tip of the clutch lever 5 extends toward the spool 2, and is located in a position adjacent to the outer periphery of the first body part 6. The clutch lever 5 pivots circumferentially about the first body part 6 between a first position depicted by a solid line (a clutch-on state) and a second position depicted by a dashed two-dotted line (a clutch-off state).

The clutch mechanism 20 performs switching between the clutch-on state and the clutch-off state when the clutch lever 5 is operated. Detailedly, when the clutch mechanism 20 is in an on state (when the clutch lever 5 is in the first position), the pinion gear 17 and the spool shaft 10 are unitarily rotated. On the other hand, when the clutch mechanism 20 is in an off state (when the clutch lever 5 is in the second position), the pinion gear 17 and the spool shaft 10 become rotatable relatively to each other. The on state and the off state of the clutch mechanism 20 are switched when the pinion gear 17 is axially moved.

The cutout part 9 is herein provided in a range between the first position and the second position, that is, in a range in which the clutch lever 5 is capable of pivoting. Therefore, the thumb is moved via the cutout part 9 during a transition from a clutch operation to a thumbing operation or vice versa. Hence, a moving path enabling smooth movement of the thumb can be reliably obtained. Additionally, the cutout part 9 is usable as a finger rest. Hence, it is also possible to quickly perform a thumbing operation or a clutch operation with the thumb put on the cutout part 9.

Especially, only by moving the clutch lever 5 with the thumb of the hand holding the reel body 1 from the first position (the clutch-on state) to the second position (the clutch-off state) and then shifting the thumb transversely (toward the spool), the thumb is guided to the cutout part 9. Then, the thumb can easily reach the curved surface 12d of the spool 2 via the cutout part 9. Accordingly, a series of motions from a clutch operation to a thumbing operation can be quickly and smoothly performed.

Other Preferred Embodiments

One preferred embodiment of the present disclosure has been explained above. However, the present disclosure is not limited to the above, and a variety of changes can be made without departing from the scope of the present disclosure.

(a) In the aforementioned preferred embodiment, only the first body part 6 is provided with the cutout part 9. Alternatively, only the second body part 7 or both of the first and second body parts 6 and 7 can be provided with the cutout part 9. Likewise, only the first body part 6 or both of the first and second body parts 6 and 7 can be provided with the finger guide surface 7c. Moreover, the reel body 1 can be provided with only one of the cutout part 9 or the finger guide surface 7c.

(b) In the aforementioned preferred embodiment, the outer peripheral surface 12b of the first flange 12 is provided with the groove(s) 12e as an exemplary recognition part(s). However, the outer peripheral surface 12b can be provided with, instead of the groove(s) 12e, a protrusion(s) that protrudes radially outward from the outer peripheral surface 12b or minute bumps and recesses that can be formed by processing such as shot peening. The protrusions, the minute bumps, and the recesses are other examples of rotation recognizing means. Alternatively, only the curved surface 12d or both of the curved surface 12d and the outer peripheral surface 12b can be provided with the groove(s) 12e, the protrusion(s) or the minute bumps and recesses.

(c) In the aforementioned preferred embodiment, the first flange 12 is disposed on the first body part 6 side of the reel body 1, whereas the second flange 13 is disposed on the second body part 7 side of the reel body 1. However, the positions of the first and second flanges 12 and 13 can be reversed. In other words, the second flange 13 can be provided with a curved surface. At this time, the second body 13 can be further provided with the cutout part 9. This construction is effective in performing the thumbing operation with higher strength.

(d) In the aforementioned preferred embodiment, the medial side surface 12a of the first flange 12 is made in the form of a slant surface and slants axially outside such that the outer diameter the medial side surface 12a gradually increases towards one distal end of the bobbin trunk 11.

However, the medial side surface 12a can be made in the form of a vertical surface and can vertically extend radially outward from one distal end of the bobbin trunk 11. Likewise, the medial side surface 13a of the second flange 13 can be also made in the form of a vertical surface and can vertically extend radially outward from the other distal end of the bobbin trunk 11. Alternatively, each of the medial side surfaces 12a and 13a can be made in the combination of a slant surface and a vertical surface.

(e) In the aforementioned preferred embodiment, each of the outer peripheral surfaces 12b and 13b of the first and second flanges 12 and 13 is shaped to slant such that the outer diameter of each of the outer peripheral surfaces 12b and 13b gradually increases in accordance with an axially outward extension from each of the outermost diameter parts 12a' and 13a' of the medial side surfaces 12a and 13a. However, each of the outer peripheral surfaces 12b and 13b can be made in the form of a flat surface extending axially outward from each of the outermost diameter part 12a' and 13a' of the medial side surfaces 12a and 13a parallel to the spool shaft 10.

What is claimed is:

1. A dual-bearing reel configured to release a fishing line in a forward direction, the dual-bearing reel comprising:
   a reel body including a first body part, a second body part, and a thumb rest, the second body part disposed at an interval from the first body part in an axial direction, the thumb rest on a rear side of the first body part and the second body part and between the first body part and the second body part;
   a spool rotatably disposed between the first body part and the second body part, the spool including a bobbin trunk, a first flange, and a second flange, the fishing line to be wound about an outer periphery of the bobbin trunk, the first flange on a first body part side of the bobbin trunk, the first flange having a smaller diameter than the first body part, the second flange on a second body part side of the bobbin trunk, the second flange having a smaller diameter than the second body part;
   a handle rotatably attached to an outer lateral surface of the reel body; and
   a clutch lever provided on an outer lateral surface of the first body part of the reel body, the clutch lever having a tip extended toward the spool, the clutch lever configured to pivot between a first position and a second position, the first position corresponding to a clutch-on state in which the handle and the spool are coupled to each other, the second position corresponding to a clutch-off state in which the handle and the spool are decoupled from each other, wherein
   the first body part includes a cutout part on an outer edge of the first body part, the cutout part continuing into the thumb rest and adjacent to an outer edge of the first flange of the spool, and
   the cutout part is on the outer edge of the first body part and adjacent to the thumb rest in a pivotable range of the clutch lever between the first position and the second position.

2. The dual-bearing reel according to claim 1, wherein the cutout part includes a curved surface, the curved surface recessed to an inner peripheral side of the first body part, the curved surface slanting such that an outer diameter of the curved surface reduces in accordance with proximity to the outer edge of the first flange of the spool.

3. The dual-bearing reel according to claim 2, wherein the thumb rest includes a circular-arc surface, and
   the circular-arc surface continues into the curved surface.

4. The dual-bearing reel according to claim 1, wherein each of the first and second flanges includes a medial side surface and an outer peripheral surface, the medial side surface on an end of the bobbin trunk, the outer peripheral surface extending axially outward from a distal end of the medial side surface,
   the distal end of the medial side surface of one of the first and second flanges has a larger outer diameter than the distal end of the medial side surface of the other of the first and second flanges, and
   the medial side surface and the outer peripheral surface of the one of the first and second flanges are connected by a smooth curved surface.

5. The dual-bearing reel according to claim 4, wherein the other of the first and second flanges further includes a cylindrical surface, the cylindrical surface extending axially outward from an outermost diameter part of the outer peripheral surface of the other of the first and second flanges.

6. The dual-bearing reel according to claim 4, wherein the outer peripheral surface of the one of the first and second flanges slants more gently than the medial side surface of the one of the first and second flanges with respect to a rotational axis of the spool.

7. The dual-bearing reel according to claim 4, wherein at least one of the outer peripheral surface and the curved surface of the one of the first flange and the second flange includes a recognition part accessible through the cutout part, the recognition part being an irregularity along the one of the outer peripheral surface and the curved surface in a circumferential direction about a rotational axis of the spool.

8. The dual-bearing reel according to claim 7, wherein the recognition part includes at least one of a protrusion or an indentation.

9. The dual-bearing reel according to claim 1, wherein the first or second body part includes a finger guide surface formed by cutting out an outer edge of the first or second body part located on a front side of the spool, below a rotational center of the spool, and adjacent to an outer edge of the first or second flange.

* * * * *